United States Patent Office 3,652,642
Patented Mar. 28, 1972

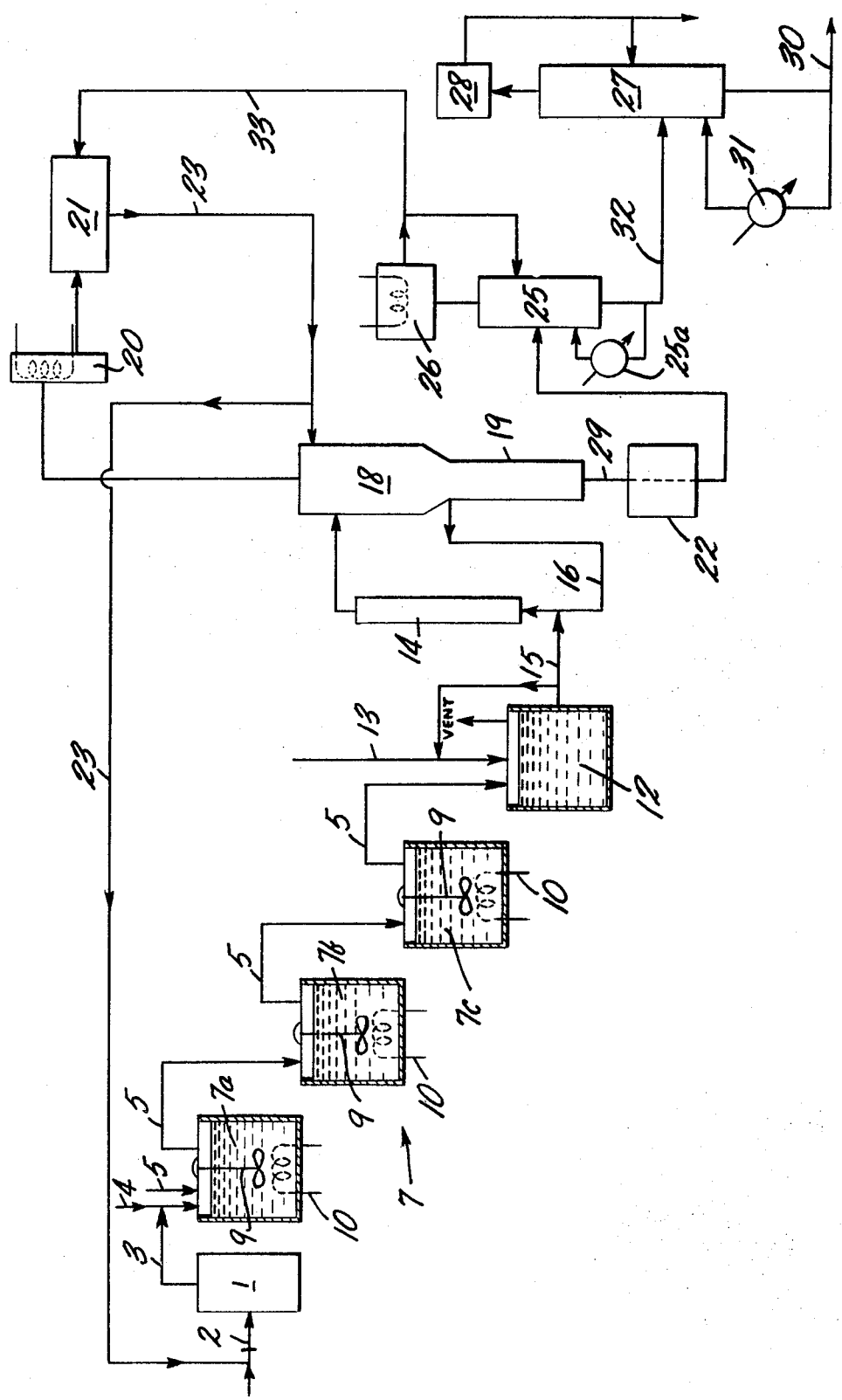

3,652,642
CONTINUOUS PROCESS FOR THE PREPARATION OF 2-METHYLENE GLUTARONITRILE
Theodore B. Baba, Hillsdale, N.J., assignor to National Distillers and Chemical Corporation, New York, N.Y.
Filed Aug. 22, 1969, Ser. No. 852,288
Int. Cl. C07c 121/20
U.S. Cl. 260—465.8 D
12 Claims

ABSTRACT OF THE DISCLOSURE

A continuous process for the preparation of 2-methylene glutaronitrile by dimerizing, in a cascading series of reaction stages, acrylonitrile dissolved in a solvent comprising an alkanol and an aromatic hydrocarbon in the presence of a tertiary phosphine containing at least one cycloalkyl group. The preferred solvent is a mixture of tertiary butanol and benzene. The preferred catalyst is tricyclohexyl phosphine. The 2-methylene glutaronitrile is separated from the reactor effluent from the series of reactor stages by stripping out the lower boiling acrylonitrile and solvents and then distilling off the 2-methylene glutaronitrile from the higher boiling residue.

---

This invention relates to a process for the preparation of 2-methylene glutaronitrile. More particularly, it relates to a process for the preparation of 2-methylene glutaronitrile by the catalytic dimerization of acrylonitrile.

The dimerization of acrylonitrile has been studied by many investigators. Various procedures have been tried and generally each of the many procedures for dimerizing acrylonitrile results in a different isomer, or mixture of isomeric or related products. This indicates that such dimerizations involve competing reaction mechanisms for dimerization, as well as other competing reactions, most importantly, reactions to form higher polymers than dimers.

For example, thermal treatment of acrylonitrile results in the formation of a saturated cyclic dimer, 1,2-dicyanocyclobutane, as noted by Coyner et al., J. Am. Chem. Soc. 71 324 (1949). Various catalytic processes have also been disclosed, where the composition of the products obtained by each process differs, depending upon the catalyst used, and the conditions under which the acrylonitrile is contacted with the catalyst. Examples of such catalytic processes are described by Takashina et al., J. Am. Chem. Soc. 84 489 (1962); Baizer et al., J. Org. Chem. 30 1357 (1956); Belgian Pat. No. 644,774; U.S. Pat. No. 3,225,-083; and French Pat. No. 1,411,003, (U.S. Ser. No. 271,-463).

Acrylonitrile, $CH_2=CHCN$, can react in several ways to form dimers of different isomeric structures and also can react in several ways to form higher polymers, including trimer, tetramer and hexamer and higher. Several polymerization reactions that acrylonitrile undergoes under different conditions in the presence of various catalysts and solvents are:

(1)

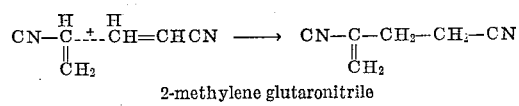

2-methylene glutaronitrile (2)

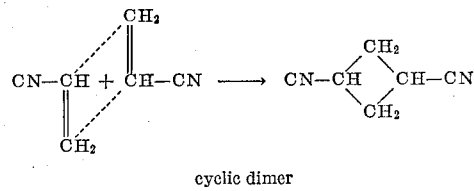

cyclic dimer (3)

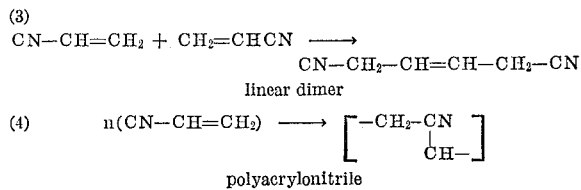

linear dimer (4) $n(CN-CH=CH_2) \longrightarrow \left[ \begin{array}{c} -CH_2-CN \\ | \\ CH- \end{array} \right]$ polyacrylonitrile In view of this, it is not surprising that it is not easy to arrest the reaction at the dimer stage. The unsaturated dimers and higher polymers can react with acrylonitrile or with other molecules of unsaturated dimer or higher polymers, to form complicated high polymer reaction products.

The preferred catalysts for dimerization have been the tertiary phosphines, including the triaryl phosphines, such as triphenyl phosphine, trialkyl phosphines, such as triethyl and tributyl phosphine, as well as tricycloalkyl phosphines and various mixed phosphines containing a mixture of groups such as alkyl, aryl, cycloalkyl, etc. Dimerizations using these catalysts generally are carried out in a solvent for the acrylonitrile. The solvent has also been found to have an effect on the course of the reaction, including the percent of conversion, the yield, and even the products obtained. Generally, the solvents employed have been alcohols, such as tert-butyl alcohol; hydrocarbons, including aliphatic and aromatic hydrocarbons, such as benzene, hexane, cyclohexane, isooctane; and mixtures thereof. Non-hydrocarbon solvents, such as dimethyl formamide and certain oxygen-containing solvents, are also considered to be inert solvents for the reaction. The preferred solvents have generally been the alcohols, hydrocarbons or single phase mixtures thereof.

Similarly, the temperatures at which the reactions are carried out have an effect on the product. As a result of the complexity of the reaction and the large number of variables which can affect the course of the reaction, it has not been possible to predict in advance the effect of a specific combination of temperature, solvents and catalysts upon the conversion of acrylonitrile nor upon the products which are obtained as a result of the conversion. For example, McClure, U.S. Pat. No. 3,225,083 dated Dec. 21, 1965, discloses the dimerization of acrylonitrile to form 1,4-dicyano-1-butene in the presence of a tertiary aromatic phosphine catalyst and preferably a tertiary hydroxyl solvent, e.g. a tertiary alcohol, without any other solvents being present.

Takashina et al., J. Am. Chem. Soc. 84 489 (1962), disclose the polymerization of acrylonitrile to the dimer, 1,4-dicyano-1-butene, and hexacrylonitrile. Takashina, et al. disclose the reaction as taking place in the presence of triphenyl phosphine catalyst in an alcohol solvent. They also disclose the preparation of an acrylonitrile polymer when using triethyl phosphine as the catalyst, benzene as the solvent, and low temperatures.

Baizer et al., J. Org. Chem. 30 1357 (1965) describe the polymerization of acrylonitrile to a mixture of alpha-methylene glutaronitrile, linear dicyanobutene and polymer, when utilizing triphenyl phosphine as catalyst and an alcohol solvent.

Since the product obtained from the polymerization of acrylonitrile varies, based upon the conditions of the reaction, it is very difficult to predict what effect even a small change in conditions will have on the course of a reaction. Therefore, it is not possible to scale up to a commercial process, a laboratory scale or even pilot plant scale process, nor is it possible to convert a batch to a continuous process and predict the array of polymeric products that will be obtained. It is not possible to predict how the various competing reactions will proceed under the different conditions present in a continuous system. For a high yield, in a continuous process, moreover, it is necessary to minimize coversion to the other possible polymeric and isomeric products, and optimize the conversion to the desired polymer, such as the dimer, alpha-methylene glutaronitrile. What conditions for a continuous process will avoid the formation of polymeric and isomeric acrylonitrile dimers cannot be determined from batch procedures. Another complexity arises from the gradual loss of the catalyst during the course of the reaction, which is caused by the tertiary phosphine's reacting with acrylonitrile in an irreversible manner to form a phosphorus-containing polymer.

The invention provides a continuous process for economically obtaining alpha-methylene glutaronitrile in a satisfactory conversion and yield, based upon the amount of catalyst and acrylonitrile utilized, and with a minimum of by-products, comprising continuously blending a solution of acrylonitrile, a lower alkanol and an aromatic hydrocarbon solvent and a tertiary cycloalkyl phosphine catalyst in a first stage of a cascading series of reaction stages, initiating dimerization of the acrylonitrile in the first stage while continuously feeding in reactants and drawing off partially reacted 2-methylene glutaronitrile-containing effluent reaction mixture from the first stage, continuously feeding the first stage effluent to at least one subsequent reaction stage, and continuing dimerization to a higher degree of conversion of acrylonitrile to 2-methylene glutaronitrile in such subsequent reaction stage or stages, continuously withdrawing effluent from the final reaction stage and at a desired degree of conversion of acrylonitrile quenching the catalyst to arrest the reaction. Each reaction stage should be vigorously stirred to insure complete mixing and a relatively uniform dynamic equilibrium concentration of the reactants and reaction product in each reaction stage.

The 2-methylene glutaronitrile can be readily separated from the final stage effluent reaction mixture of the invention by distillation; under the reaction conditions of this process, the products formed have significantly different boiling points. The effluent withdrawn from the final stage of the process contains 2-methylene gluatronitrile, small amounts of high-boiling higher polymers of acrylonitrile, residual tertiary phosphine catalyst, and its reaction products. To prevent losses of 2-methylene-glutaronitrile by conversion to polymers during separation, an acid, preferably, a high boiling acid such as adipic acid, is added to the reaction mixture after leaving the final reactor stage to destroy the catalyst.

The reason why the use of a cascading series of reactor stages results in an especially good yield and conversion of acrylonitrile to 2-methylene glutaronitrile is not known. However, it is believed that it can be explained by the fact that in a series of cascading stirred reactors, the reaction mixture reaches a dynamic equilibrium in each stage at a lower average proportion of acrylonitrile to dimer in the reaction mixture after the first stage. This is thought to decrease the amount of higher polymers formed. Why the formation of the 2-methylene glutaronitrile instead of another dimer is preferred however is not readily apparent, but the catalyst and reaction conditions undoubtedly play an important role in so directing the reaction.

The distillation to separate the 2-methylene glutaronitrile is preferably carried out in several steps. In the first distillation step, the lower-boiling compounds, the light ends boiling lower than 2-methylene glutaronitrile, are separated; the light ends comprise most of the solvent and unreacted acrylonitrile monomer. These materials can be condensed and recycled.

In a second distillation step, the bottoms, or higher boiling fraction, from the first distillation step are further fractionated under a low vacuum of from about 50 to about 200 mm. Hg to remove any remaining acrylonitrile and solvent.

In the next stage, preferably carried out under a high vacuum, of from about 5 to about 20 mm. Hg, and optionally at a higher temperature, 2-methylene glutaronitrile is distilled off overhead, and the bottoms, which consist primarily of high-boiling higher acrylonitrile polymers, reacted catalyst and some 2-methylene glutaronitrile, can be discarded, recycled for further distillation, or treated further to remove any remaining 2-methylene glutaronitrile (MGN).

The catalytic dimerization of acrylonitrile to form 2-methylene glutaronitrile can be carried out at a temperature of from about 32° F. to about 200° F. and preferably at from about 80° to about 140° F. Although the temperature is preferably maintained constant throughout the reaction system, there can be a variation in temperature among the stages.

Pressure has little or no effect on the course of the reaction, which takes place in the liquid phase. Accordingly, for ease of operation, it is preferably carried out at atmospheric pressure, or slightly above, to prevent entry of moisture from the atmosphere into the reaction zone. As the reaction should be carried out in the liquid phase, the pressure should be high enough to retain the major part of the reactants in the liquid phase at the reaction temperature.

The total residence time in the cascade of reactor stages is from about two to about twenty hours with the preferred total residence time being from about 2½ to about 7½ hours.

The residence time in each reaction stage of the reactor system is greater after the first reaction stage, and preferably increases with each successive stage. In this way, residence time in the first reactor is the least, which limits the residence time in the presence of the highest concentration of acrylonitrile, and which therefore tends to limit the formation of higher polymers.

Although, generally, the yield is higher, the greater the number of reaction stages, it has been found that the greatest economies are obtained with from three to five reaction stages. Three has been found to be optimum, from the standpoint of economics. With three reaction stages, the residence time in the first stage is preferably from about ¾ to about 2½ hours, in the second stage from about 1 to about 2¾ hours, and in the third stage from about one to about three hours.

Preferably, the residence time in the first stage is selected such that from about 5 to about 20% of the total amount of 2-methylene glutaronitrile is formed in the first stage. This can be determined by analyzing the effluent from this stage. This further tends to limit the undesirable side reactions forming the higher polymers.

The solvents which are useful for the process of the present invention are aromatic hydrocarbons and alkanols. The mixture comprising the alkanol, aromatic hydrocarbon and acrylonitrile preferably contains from about 1 to about 50% by volume of an alkanol having from three to about eighteen carbon atoms and preferably from about three to about ten carbon atoms and from 1 to 94% by volume of the aromatic hydrocarbon. The reaction mixture preferably contains from about 2 to about 35% by weight alkanol and 30 to 73% by weight aromatic hydrocarbon.

The alkanol can be a primary, secondary or tertiary alcohol, having straight or branched chains but preferably is a tertiary alkanol. The alkanols useful for the process of this invention include isopropanol, n-butanol, sec-butanol, tert-butanol, isopentanol, tert-pentanol, 2-methylpentanol, 2,2-dimethyl pentanol, t-hexanol, 2-ethyl-hexanol, tert-decanol, cyclohexanol, menthol, tri-ethyl carbinol, propyl diethyl carbinol, tri-n-butyl carbinol and butyl diethyl carbinol. The aromatic hydrocarbons preferably contain from about six to about twenty carbon atoms and preferably from about six to twelve. Useful aromatic hydrocarbons include benzene, toluene, xylene, ethyl benzene and 1-ethyl-3-methyl benzene, the preferred solvent being benzene in admixture with a tertiary alkanol.

The proportion of acrylonitrile in the feed solution is from about 10% to about 50% and preferably from about 25% to about 35% by weight.

The catalyst is continuously fed to the reaction mixture at a rate such that the proportion of catalyst in the reactor stages is from about 0.02 to about 10% by weight of the acrylonitrile and preferably from about 0.1 to about 1.1% by weight. The use of higher proportions of catalyst produces no more dimer but tends to increase the amount of polymer produced. Thus, the proportion of catalyst fed to the reaction mixture is important in optimizing the conversion of acrylonitrile and yield of 2-methylene glutaronitrile. The optimum proportion of catalyst varies, depending upon which tertiary phosphine is used.

The catalyst can be added in substantially pure form, but is preferably first diluted in a solvent, such as an aromatic hydrocarbon or a mixture of hydrocarbons as referred to above, preferably at a concentration of from about 10 to about 30% by weight. The concentration of the catalysts in this latter diluent is not critical, however. Although it is preferred that all of the tertiary phosphine catalyst be added with the feed to the first stage of the reactor, it is possible also to reserve a part of the tertiary phosphine catalyst, and add the remainder in one or more of the succeeding stages of the reaction, to make up the total desired proportion of the catalyst added to the reactor system. The proportion of catalyst in the first stage is then lower than in the later stages, and this also helps to limit polymer formation, when the amount of acrylonitrile is high, while when the amount of acrylonitrile is less, the proportion of catalyst can be increased, and also catalyst losses replaced.

The tertiary phosphines employed as catalysts in this process are preferably the tertiary cycloalkyl phosphines, i.e. phosphines having from one to three cycloalkyl groups. These tertiary phosphines have the formula

wherein at least one and preferably three R groups are cycloalkyl, and the remaining R groups are alkyl. Exemplary R cycloalkyl groups include cyclopentyl, cyclohexyl, cycloheptyl, methyl cyclohexyl, methyl cyclopentyl, and cyclooctyl. Exemplary R alkyl groups are methyl, ethyl, butyl, amyl, hexyl, octyl and dodecyl. The R cycloalkyl group has from about five to about twelve carobn atoms, and R alkyl groups have from one to about twelve carbon atoms.

Examples of tertiary phosphines include tricyclohexyl phosphine, tri(methyl cyclohexyl) phosphine, mono-n-butyl di(cyclohexyl) phosphine, and di(cyclohexyl) monopropyl phosphine. The preferred phosphines are the tricyclohexyl phosphines, and especially tricyclohexyl phosphine.

Other tertiary phosphine catalysts can also be used in the process of this invention including trialkyl phosphines, triaryl phos phines, mixed alkylaryl phosphines, and phosphines containing aromatic heterocyclic groups.

Zerovalent nickel adducts of any of the above teritary phosphines can also be used as the catalyst if desired. Examples of such adducts include compounds derived from nickel carbonyl having the formula:

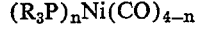

where R is an alkyl, aryl or heterocyclic radical and $n$ has a value of one or two; and nickel catalysts having the formula:

wherein A is a tertiary phosphine, as defined above, and B is acrylonitrile, cinnamonitrile, fumaronitrile or acrolein.

A polymerization inhibitor can also be fed to the reaction mixture, such as p-tert-butyl catechol, in an amount of from about 0.1 to 5% by weight of the acrylonitrile fed. The polymerization inhibitors have an insignificant effect in depressing the dimerization of the acrylonitrile to 2-methylene glutaronitrile, but repress, to a degree, the formation of the higher polymers.

The reaction mixture leaving the final stage of the reaction system can be quenched by introducing air into the reaction mixture or by neutralizing the tertiary phosphine catalyst by the addition of an acid, preferably a high boiling organic carboxylic acid such as sebacic acid, propionic acid, or adipic acid.

Generally, to avoid polymerization of the 2-methylene glutaronitrile product, during the separation procedure, the temperature should not be permitted to rise above 320° F.

When carrying out the process of this invention, care should be taken to exclude moisture from the reaction system. Although a certain amount of water can be tolerated, an excessive build up of water, as would occur in a continuous system with recycling unless all streams entering the system were first dried, must be avoided. Accordingly, the acrylonitrile, the solvents and the catalyst being fed to the system should all be dried first. The material which is recycled from the purification system is presumably free of water and, therefore, by recycling, the amount of material fed to the system which must be dried before entering the system is reduced, and the load upon the drier is accordingly reduced.

To eliminate the leakage of oxygen or moisture from the atmosphere, the process is preferably carried out under an inert gas atmosphere, at a pressure at least slightly above atmospheric to prevent the leakage of atmospheric air into the reaction system. Suitable inert gases include nitrogen, argon and helium. Each of these gases should be carefully dried before being fed to the system.

The drawing is a schematic flow diagram showing apparatus for use in the continuous process according to this invention. The use of this system is illustrated in the following example, which represents a preferred embodiment of this invention.

EXAMPLE

A combination of make up and recycle solution of acrylonitrile in benzene and tert-butanol (ratio 6:1) is fed through the inlet 2 to the reactant feed dried 1, where any residual water is removed. The dry mixture of 10% tert-butyl alcohol, 61.5% benzene, 28% acrylonitrile and 0.5% methylene glutaronitrile (from the recycle), is fed at a rate of 6853 lbs./hour through line 3, where it is mixed with the dry catalyst solution in line 3, the catalyst solution is fed at a rate of 11 lbs. hr. and comprises a solution of 80% benzene and 20% tricyclohexyl phosphine. The combined stream enters the first stage reactor 7a of the cascading reactor system 7. The three cascading reactors 7a, 7b and 7c, each contain a propeller-type stirrer 9, and each is cooled by cooling water in coils 10 to maintain a temperature of approximately 100° F. The reaction mixture from the first stage reactor 7a overflows to the second stage reactor 7b; the reaction mixture from the second stage reactor 7b underflows to the third stage reactor 7c; the effluent from the final stage 7c overflows to the surge tank 12. Adipic acid is continuously added through the line 13 to the surge tank 12 to neutralize the tricyclohexyl phosphine catalyst, thus quenching the reaction. There is a residence time of 1½ hours, two hours and 2½ hours, respectively in each of the three stages.

An inert nitrogen blanket is maintained over the reaction mixture in each of the reactor stages 7a, 7b and 7c, by passing dry nitrogen gas into the reactor stages over the reaction mixture, through lines 5; the reactors are vented from the surge tank 12 to the atmosphere.

The effluent reaction mixture is drawn off from surge tank 12 through the exit line 15 to line 16 where it is combined with liquid from the upper portion of the two-stage evaporator stripper 18, in the line 15, and is then heated in the reboiler 14 for the evaporator 18; the reboiler heats the liquid to about 225° F. Hot liquid and vapor from the reboiler 14, is then passed to the upper section of the evaporator 18, where the pressure is 380 mm. Hg absolute. Four film trays in the upper section of the evaporator 18 provide sufficient rectification to provide an overhead vapor stream (acrylonitrile and solvent) containing not more than 0.5 weight percent 2-methylene glutaronitrile. The overhead vapors are condensed in condenser 20 and the condensate liquid collected in the recycle surge drum 21. A minor proportion of liquid is refluxed to the evaporator tower 18, and the remaining major portion is recycled via the recycle line 23 to be mixed with the feed in line 2 to the reactor feed drier 1. The major part of the liquid bottoms from the upper half of the evaporator 18 pass down into the lower portion 19 of the evaporator where they are again stripped to vaporize any remaining light ends, which vapor passes up to the upper portion to be rectified. The crude 2-methylene glutaronitrile product via line 29 to the bottoms receiver 22, and then to the light ends tower 25 to strip off remaining solvent.

The light ends tower 25 is operated at a lower vacuum, 100 mm. Hg absolute, and a temperature of about 300° F. at the bottom of the tower, and contains four theoretical film trays in the rectifying section and five in the stripping section. The overhead vapors, tertiary butyl alcohol and benzene, from the tower 25 are condensed in a pair of condensers 26, a portion of the condensed liquid being refluxed to the tower 25, and the remainder of the condensed liquid being sent through line 33 to the recycle surge drum 21, to be recycled via line 23 as part of the recycle solvent from 18. The bottoms liquid from tower 5 is in part recycled through the light ends reboiler 25a and the remainder via line 32 is transferred to the heavy ends tower 27 to strip out the purified 2-methylene glutaronitrile. The tower 27 is a packed tower, providing the equivalent of five theoretical trays in each of the stripping and rectification sections. The tower 27 is operated at a lower vacuum, 7 mm Hg solvent mixture comprising a tertiary alkanol containing from about 3 to about 18 carbon atoms and an aromatic hydrocarbon containing from about 6 to about 20 carbon atoms, in the presence of from about 0.02 to about 10% by weight of the acrylonitrile of a tertiary phosphine catalyst, continuously withdrawing partially reacted effluent containing unreacted acrylonitrile, solvent mixture, catalyst and 2-methylene glutaronitrile, to two to four subsequent reaction stages to form 2-methylene glutaronitrile, maintaining the reaction temperature at from about 32° F. to about 200° F. in each stage for a total residence time in all reaction stages of from about 2 to about 20 hours, with a first stage residence time of at least ¾ hour and with the residence time in each stage being greater than the time in the immediately preceding stage, continuously withdrawing the reaction mixture from the final reaction stage, adding a high boiling organic carboxylic acid in an amount to neutralize and quench the catalyst, stripping volatile solvent and unreacted acrylonitrile, distilling 2-methylene glutaronitrile from the residue and recovering 2-methylene glutaronitrile as the major product of the reaction.

2. The continuous process of claim 1 containing 3 reaction stages.

3. The continuous process of claim 2 wherein the reaction in each of the stages is carried out at a temperature of from about 80° to about 140° F.

4. The continuous process of claim 3 containing three reaction stages wherein the residence time in the first stage reaction vessel is from about ¾ to about 2½ hours, in the second stage reaction vessel is from about one to about 2¾ hours and in the third stage reaction